United States Patent
Wood et al.

(10) Patent No.: US 7,182,262 B2
(45) Date of Patent: Feb. 27, 2007

(54) INERTIAL DRIVE SCANNING ARRANGEMENT AND METHOD

(75) Inventors: Frederick F. Wood, Medford, NY (US); Dmitriy Yavid, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/387,878

(22) Filed: Mar. 13, 2003

(65) Prior Publication Data

US 2004/0178273 A1    Sep. 16, 2004

(51) Int. Cl.
G02B 5/08 (2006.01)
G02B 26/00 (2006.01)
G06K 7/10 (2006.01)

(52) U.S. Cl. .......................... 235/462.36; 235/462.37; 359/198

(58) Field of Classification Search ........... 235/462.32, 235/462.36, 462.37, 462.33, 462.01, 454, 235/462.14; 359/877, 224, 198, 199, 225, 359/212, 213, 214, 872; 310/331
See application file for complete search history.

(56) References Cited

U.S. PATENT DOCUMENTS

| | | | | |
|---|---|---|---|---|
| 4,025,203 A * | 5/1977 | Lee | | 359/224 |
| 4,705,365 A * | 11/1987 | Wakita et al. | | 359/224 |
| 4,708,420 A * | 11/1987 | Liddiard | | 359/199 |
| 5,579,148 A * | 11/1996 | Nishikawa et al. | | 235/462.36 |
| 5,594,232 A * | 1/1997 | Giordano | | 235/462.33 |
| 5,621,371 A * | 4/1997 | Dvorkis et al. | | 235/462.36 |
| 5,866,894 A * | 2/1999 | Bard et al. | | 235/462.01 |
| 5,867,297 A * | 2/1999 | Kiang et al. | | 235/462.32 |
| 6,049,407 A * | 4/2000 | Melville | | 359/198 |
| 6,075,639 A * | 6/2000 | Kino et al. | | 359/224 |
| 6,198,565 B1 * | 3/2001 | Iseki et al. | | 359/224 |
| 6,201,629 B1 * | 3/2001 | McClelland et al. | | 359/223 |
| 6,259,548 B1 * | 7/2001 | Tsugai et al. | | 359/224 |
| 6,295,154 B1 | 9/2001 | Laor et al. | | |
| 6,672,732 B1 * | 1/2004 | Niendorf et al. | | 359/877 |
| 6,882,455 B2 * | 4/2005 | Arima | | 359/224 |
| 6,904,195 B2 * | 6/2005 | Bowers et al. | | 385/18 |
| 6,924,476 B2 * | 8/2005 | Wine et al. | | 250/235 |
| 7,098,571 B2 * | 8/2006 | Adams et al. | | 359/872 |
| 2002/0162888 A1 * | 11/2002 | Wood | | 235/462.14 |
| 2002/0171901 A1 * | 11/2002 | Bernstein | | 359/224 |
| 2003/0053186 A1 * | 3/2003 | Arima | | 359/224 |

(Continued)

FOREIGN PATENT DOCUMENTS

JP    63-177991 A  *  7/1988

(Continued)

OTHER PUBLICATIONS

*A Novel Asymmetric Silicon Micro-Mirror for Optical Beam Scanning Display*, 1998 IEEE, K. Yamada, et al., ULSI Application Research Laboratory, Silicon Systems Research (no month available).

(Continued)

Primary Examiner—Jared J. Fureman
(74) Attorney, Agent, or Firm—Kirschstein, et al.

(57) ABSTRACT

A light scanning arrangement includes a frame directly moved by an inertial drive in order to oscillate a scan element supported by a hinge on the frame at high scan rates and with minimal electrical power consumption.

27 Claims, 3 Drawing Sheets

U.S. PATENT DOCUMENTS

| | | | | |
|---|---|---|---|---|
| 2003/0053232 | A1* | 3/2003 | Dalziel | 359/877 |
| 2003/0137711 | A1* | 7/2003 | Yagi et al. | 359/224 |
| 2003/0168942 | A1* | 9/2003 | Iino et al. | 310/331 |
| 2003/0227700 | A1* | 12/2003 | Mizuno et al. | 359/877 |
| 2004/0004775 | A1* | 1/2004 | Turner et al. | 359/877 |
| 2004/0027449 | A1 | 2/2004 | Turner et al. | |
| 2005/0243446 | A1* | 11/2005 | Wood | 359/846 |
| 2006/0012844 | A1* | 1/2006 | Fujii et al. | 359/224 |

FOREIGN PATENT DOCUMENTS

JP            6-68507 A  *  3/1994

OTHER PUBLICATIONS

*Two Dimensional Silicon Micromachined Optical Scanner Integrated with Photodetector and Piezoresistor*, M. Ikeda, et al., OMRON Corporation, Transducers 95, Jun. 1995.

*The 2-Dimesional Micro Scanner Integrated with PZT Thin Film Actuator*; T. Kawabata, Central R&D Laboratory, OMRON Corporation, 1997 IEEE, Transducers '97, Jun. 16-19, 1997, pp. 339-.

*A Novel High Resolution Optical Scanner Actuated by Aerosol Deposited PZT Films*, 2003 (no month available).

*Design and Fabrication of 1D and 2D Micro Scanners Actuated by Double Layered (no date available) PZT Bimorph Beams*, J. Tsaur, et al., National Institute of Advanced Industrial Science and Technology.

*Dynamic and Static Behavior of Piezoelectric Bimorphs with Extenders in Optical Scanners*, J. Smits, GSILumonics, May 2000 IEEE, 2000 IEEE Ultrasonics Symposium, pp. 1093-.

*Design Optimization & Improved Performance on the Link Beam Driven, Miniaturized Scanning Mirror Device*, N. Konno, et al., Industrial Electronics & Systems Laboratory, Aug. 2000.

*PZT Thin-Film Actuator Driven Micro Optical Scanning Sensor by 3D Integration of Optical and Mechanical Devices*, M. Ikeda, et al., Central R&D Laboratory, OMRON Corporation, 1999 (no month available).

*A Piezoelectric Actuated Scanning Mirror System Utilizing a Type One Control LOOP*, Session 12C4, M. Garris, University of Central Florida, 1989 IEEE, pp. 1267-1274, (no month available).

*Miniature Piezoelectric Actuators: Design Concept, Fabrication and Performance Evaluation*, C. K. Lee, et al., Institute of Applied Mechanics, 1998 IOP Publishing Ltd., pp. 312-326. (no month available).

* cited by examiner

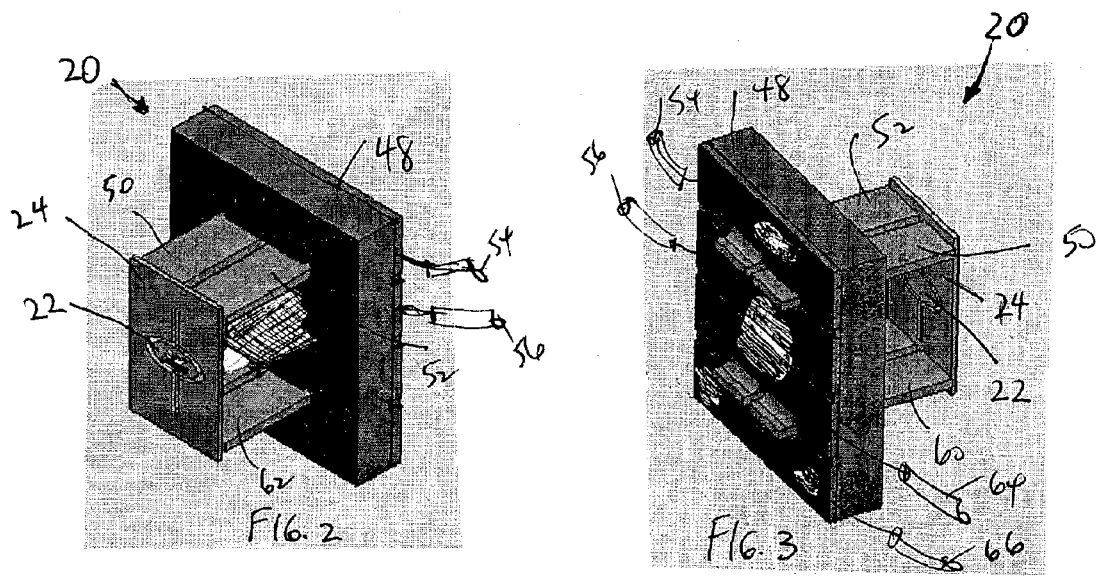
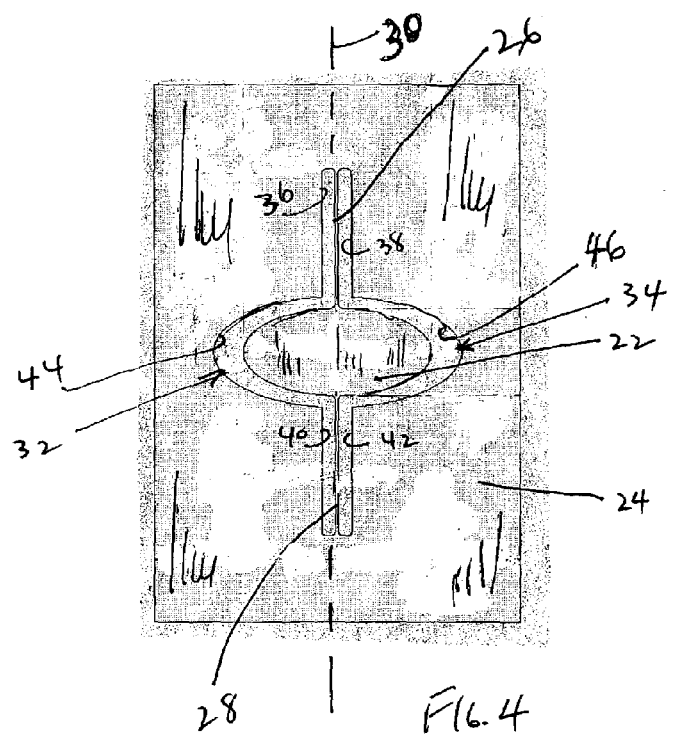

INERTIAL DRIVE SCANNING ARRANGEMENT AND METHOD

BACKGROUND OF THE INVENTION

1. Field of the Invention

The present invention generally relates to a light scanning arrangement for and method of repetitively scanning targets, for example, optical codes, and, more particularly, to operating such a scanning arrangement under low electrical power conditions to minimize usage of electrical power and at high scan rates.

2. Description of the Related Art

Various optical code readers have been developed heretofore to read optical codes, such as bar code symbols applied to objects in order to identify each object by optically reading the symbol thereon. The bar code symbol itself is a coded pattern comprised of a series of bars of various widths and spaced apart from one another to bound spaces of various widths, the bars and spaces having different light reflecting properties. The readers electro-optically decoded the coded patterns to multiple digit representations descriptive of the objects. Readers of this general type have been disclosed, for example, in U.S. Pat. No. 4,251,798.

As disclosed in the known art, a particularly advantageous embodiment of such a reader resided, inter alia, in emitting a light beam, preferably a laser beam, emitted from a light source, preferably a gas laser or a laser diode, and in directing the laser beam to a symbol to be read. En route to the symbol, the laser beam was directed to, and reflected off, a light reflector of a scanning component. The scanning component moved the reflector in a cyclical fashion and caused the laser beam to repetitively scan the symbol. The symbol reflected the laser beam incident thereon. A portion of the incident light reflected off the symbol was collected and detected by a detector component, e.g., a photodiode, of the reader. The photodiode had a field of view, and the detected light over the field of view was decoded by electrical decode circuitry into data descriptive of the symbol for subsequent processing. The cyclically movable reflector swept the laser beam across the symbol and/or swept the field of view during scanning at a scan rate.

Several different types of scanning components were known in the art. For example, U.S. Pat. No. 4,251,798 disclosed a polygonally-shaped multi-faced wheel having mirrored outer surfaces on each of its faces. The wheel was mounted for rotation so that each mirrored outer surface was, in turn, positioned in an optical path along which the incident laser beam was directed to the symbol to be scanned. Other scanning components disclosed in U.S. Pat. No. 4,251,798 were a bimorph or ferroelectric-type oscillating element, as well as a speaker-type oscillating element, each element having an oscillatable mirror.

U.S. Pat. No. 4,387,297 and U.S. Pat. No. 4,496,831 disclosed a scanning component including an electric motor operative for reciprocatingly oscillating a reflector in opposite circumferential directions relative to an output shaft of the motor. U.S. Pat. No. 4,387,297 also disclosed a penta-bimorph scanning component. U.S. Pat. No. 5,099,110 disclosed a power saving scanning component wherein a scan mirror was oscillated by releasing stored energy in a hinge.

The light reflector need not have been a single planar mirror, but, as described in U.S. Pat. No. 4,760,248, could have been an optical component having a construction which was part concave and part planar. The reflector could be driven by an electrical motor in alternate circumferential directions along arc lengths less than 360° as described in U.S. Pat. No. 4,496,831, or, in a variant construction, could be rotated completely around an axis as described in U.S. Pat. No. 4,816,661.

In still another variant construction, as described in U.S. Pat. No. 5,144,120, rather than using a reflector to effect the scanning action, the reflector was eliminated altogether in a so-called "mirrorless" design in which one or more of the other reader components were jointly or separately moved relative to one another to effect a reciprocating scanning action driven by an electrical motor. The other reader components included a light source component, e.g., a laser diode, and/or optical components, e.g., a focusing lens, and/or the photodetector component, e.g., a photodiode.

In all of the above-described scanning components, the scan rate was relatively low, on the order of less than 100 Hz. To increase the scan rate to a range from 350 Hz to 1200 Hz, U.S. Pat. No. 5,412,198 disclosed a resonance asymmetric scan element in which a scan mirror was oscillated by means of magnetic field interaction between a permanent magnet and an electromagnetic coil.

It was known in the art to mount the permanent magnet or the electromagnetic coil directly on the scan mirror to form a magnetically-driven oscillatable mirror assembly. It was also known to mount electrodes directly on the scan mirror in an electrostatically-driven oscillatable mirror assembly. This, however, increased the mass of the oscillatable assembly, thereby requiring more electrical power to drive the assembly and limiting the scan rate. In readers of the hand-held type, wherein electrical power is supplied by on-board batteries, a high electrical power requirement reduces the working lifetime of the batteries. Also, there are many applications, not limited to reading bar code symbols, where a high scan rate in excess of 1200 Hz and, indeed, at inaudible frequencies greater than 20 kHz is desired.

SUMMARY OF THE INVENTION

Objects of the Invention

One object of this invention is to advance the state of the art of readers for electro-optically reading optical codes such as bar code symbols.

Another object of this invention is to minimize electrical power consumption of such readers.

Still another object of this invention is to increase the scan rate of such readers.

Yet another object of this invention is to provide a low power, high scan rate, arrangement for scanning light in a myriad of applications not limited to reading optical codes, but, by way of non-limiting example, for projecting an image on a display surface, or for capturing an image from a target.

FEATURES OF THE INVENTION

In keeping with these objects and others which will become apparent hereinafter, one feature of this invention resides, briefly stated, in a light scanning arrangement and method, in which a movable frame supports an oscillatable scan element for reflecting light incident thereon. A hinge extending along a hinge axis is connected between the frame and the scan element. An inertial drive is operative for directly moving the frame and, by inertia, for indirectly oscillating the scan element to scan the incident light.

In accordance with this invention, the scan element has a low mass. There is no permanent magnet, or electromagnetic coil, or electrode, or like weight mounted on, or connected to, the scan element and, hence, the scan element is free to be moved at high scan rates greater than 1 kHz and preferably on the order of 20 kHz and above.

In the preferred embodiment, the frame, the hinge and the scan element are fabricated as a one-piece construction from a generally planar, silicon substrate. A specular coating is preferably coated on the scan element. The frame preferably surrounds the scan element and lies in a common plane therewith in a rest position. The scan element has a thickness on the order of 150μ and due to the high quality (Q) factor of the silicon, the scan element has a desirable low damping characteristic.

The oscillation of the scan element is achieved by inertial forces. The scan element is not directly driven. Instead, the movable frame is directly driven. In one embodiment, the frame can be oscillated about the hinge axis which extends through a center of mass of the scan element. In another embodiment, the hinge axis can be spaced along a transverse direction parallel to an axis passing through the center of mass, in which case, moving the frame in a linear direction generally perpendicular to the transverse direction will cause the scan element to oscillate about the hinge axis.

Preferably, the inertial drive is fabricated from one or more piezoelectric devices operatively connected to the frame. Each device generates a mechanical force when electrically energized. In one particularly advantageous embodiment, two piezoelectric devices are connected to the frame at opposite sides of the hinge axis. In operation, one device pushes one side of the frame in one circumferential direction about the hinge axis, while the other device simultaneously pulls the opposite side of the frame in the opposite circumferential direction. These push-pull forces are alternately transmitted through the hinge to the scan element. Thus, the scan element, which starts out in a state of rest, receives force from the moving frame, and the scan element begins to move in the same path and direction as the received force. The scan element oscillates at its resonant frequency provided the push-pull forces are generated at the same frequency. The amount of motion required from the frame is proportional to the amount of desired motion of the scan element divided by the Q factor. In a preferred embodiment, the frame stroke is under 1 μm, and the scan element moves through an arc of ±8 degrees mechanical.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a front perspective view of a preferred embodiment of a light scanning arrangement for use in the reader of FIG. 1;

FIG. 3 is a rear perspective view of the embodiment of FIG. 2;

FIG. 4 is an enlarged front view of a detail of the arrangement of FIG. 2;

DETAILED DESCRIPTION OF THE PREFERRED EMBODIMENTS

Figure 1:
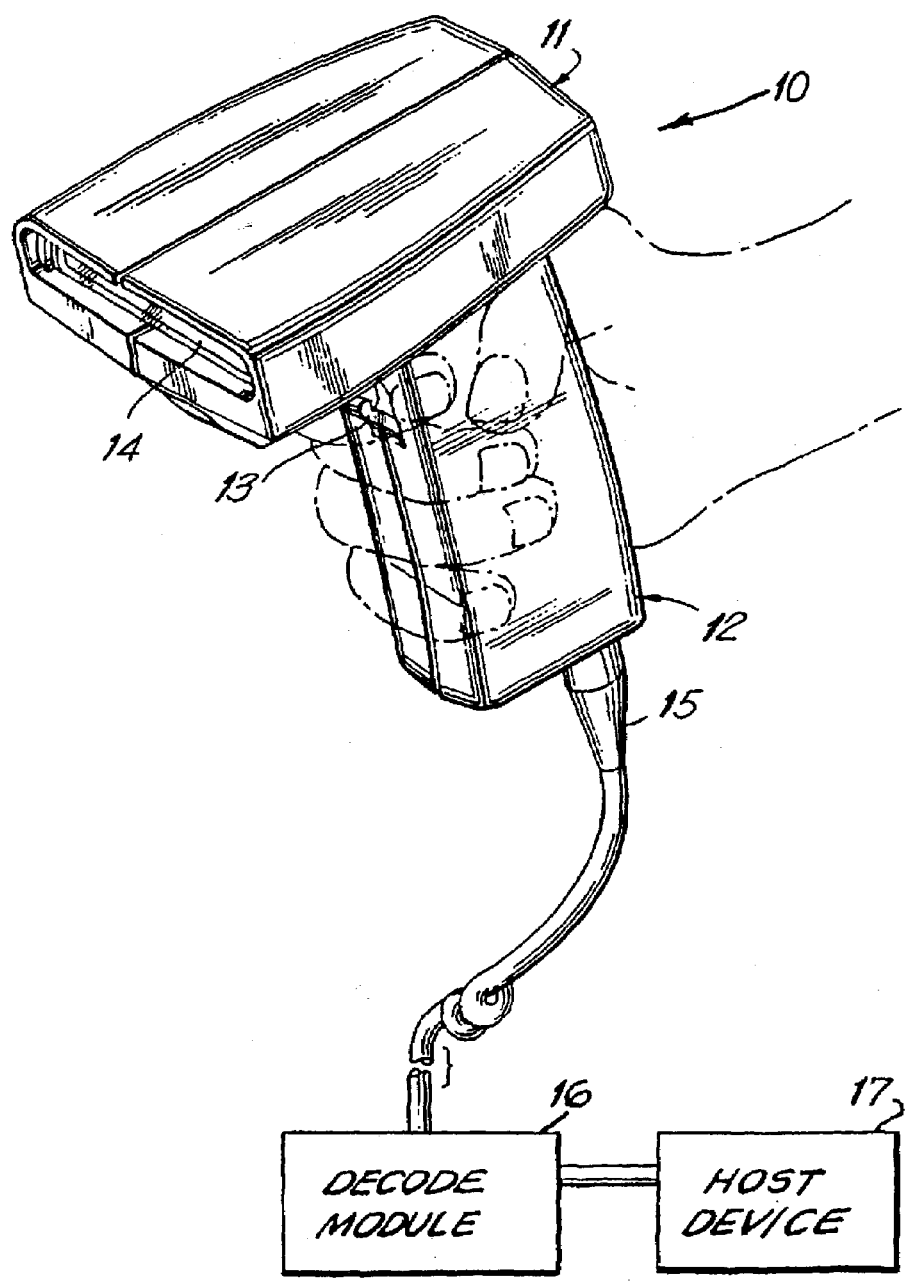
FIG. 1 is a perspective view of a hand-held reader for electro-optically reading optical codes.

Referring now to the drawings, reference numeral 10 generally identifies a hand-held, gun-shaped head having a barrel 11 and a handle 12. A manually-operable trigger 13 is situated below the barrel 11 on an upper, forwardly-facing part of the handle 12. As known from the above-identified patents, a light source component, typically, but not necessarily, a laser, is mounted inside the head 10. The light source component emits a light beam along a transmission path which extends outwardly through a window 14 that faces indicia, e.g., bar code symbols, to be read. Also mounted within the head is a photodetector component, e.g., a photodiode, having a field of view, and operative for collecting reflected light returning through the window 14 along a return path from the symbol.

A scanning component is mounted within the head 10, and is operative for scanning the symbol and/or the field of view of the photodetector. The scanning component typically, but not necessarily, includes at least one scan element or light reflector positioned in the transmission path and/or the returnpath. The scan element is driven by an electrically-operated drive in alternate circumferential directions relative to an axis.

The photodetector generates an electrical analog signal indicative of the variable intensity of the reflected light. This analog signal is converted into a digital signal by an analog-to-digital converter circuit. This digital signal is conducted, according to one embodiment, along an electrical cable 15 to a decode module 16 located exteriorly of the head 10. The decode module 16 decodes the digital signal into data descriptive of the symbol. An external host device 17, usually a computer, serves mainly as a data store in which the data generated by the decode module 16 is stored for subsequent processing.

In other embodiments, the decode module 16 is mounted within the head, and an on-board memory is used to store the decoded signal for subsequent download, either by a wired or wireless connection.

In use, each time a user wishes to have a symbol read, the user aims the head at the symbol and pulls the trigger 13 to initiate reading of the symbol. The symbol is repetitively scanned a plurality of times per second at a scan rate. As soon as the symbol has been successfully decoded and read, the scanning action is automatically terminated, thereby enabling the scanner to be directed to the next symbol to be read in its respective turn.

Turning now to FIGS. 2–4, a light scanning arrangement 20 suitable for scanning the light beam and/or the field of view in a system of the type exemplified by FIG. 1 for electro-optically reading optical codes is depicted. Arrangement 20 includes an oscillatable scan element 22, especially a planar mirror, for reflecting light incident thereon. The light may come from a light source for reflection to a code to be scanned and read, or the light may come from a target to be scanned and imaged over a field of view.

Arrangement 20 also includes a movable frame 24 for supporting the scan element 22 by means of a hinge extending along a hinge axis 30. As best seen in FIG. 4, the hinge includes a pair of colinear hinge portions 26, 28 connected between opposite regions of the scan element 22 and opposite regions of the frame. The frame 24 need not surround the scan element, as shown.

The frame, hinge portions and scan element are fabricated of a one-piece, generally planar, silicon substrate which is approximately 150μ thick. The silicon is etched to form omega-shaped slots 32, 34 having upper parallel slot sections 36, 38, lower parallel slot sections 40, 42, and U-shaped central slot sections 44, 46. Hinge portion 26 is located between slot sections 36, 38. Hinge portion 28 is located between slot sections 40,42. The scan element 22 preferably has an oval shape and is free to move in the slot sections 44, 46. In the preferred embodiment, the dimensions along the axes of the oval-shaped scan element measure 749μ×1600μ. Each hinge portion measure 27μ in width and 1130μ in length. The frame has a rectangular shape measuring 3100μ in width and 4600μ in length.

An inertial drive is mounted on a generally planar, printed circuit board 48 and is operative for directly moving the frame and, by inertia, for indirectly oscillating the scan element 22 about the hinge axis 30. One embodiment of the inertial drive includes a pair of piezoelectric transducers 50, 52 extending perpendicularly of the board 48 and into contact with spaced apart portions of the frame 24 at either side of hinge portion 26. An adhesive may be used to insure a permanent contact between one end of each transducer and each frame portion. The opposite end of each transducer projects out of the rear of the board 48 and is electrically connected by wires 54, 56 to a periodic alternating voltage source (not shown).

In use, the periodic signal applies a periodic drive voltage to each transducer and causes the respective transducer to alternatingly extend and contract in length. When transducer 50 extends, transducer 52 contracts, and vice versa, thereby simultaneously pushing and pulling the spaced apart frame portions and causing the frame to twist about the hinge axis 30. The drive voltage has a frequency corresponding to the resonant frequency of the scan element. The scan element is moved from its initial rest position until it also oscillates about the hinge axis at the resonant frequency. In a preferred embodiment, the frame and the scan element are about 150μ thick, and the scan element has a high Q factor. A movement on the order of 1μ by each transducer can cause oscillation of the scan element at scan rates in excess of 20 kHz.

Another pair of piezoelectric transducers 60, 62 extends perpendicularly of the board 48 and into permanent contact with spaced apart portions of the frame 24 at either side of hinge portion 28. Transducers 60, 62 serve as feedback devices to monitor the oscillating movement of the frame and to generate and conduct electrical feedback signals along wires 64, 66 to a feedback control circuit (not shown).

Although light can reflect off an outer surface of the scan element, it is desirable to coat the surface of the element 22 with a specular coating made of gold, silver, aluminum, or like material.

Figure 5:
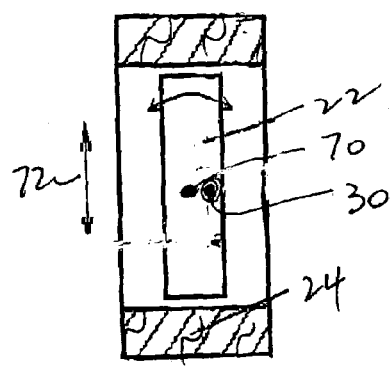
FIG. 5 is a schematic view of another embodiment of a light scanning arrangement in accordance with this invention.
Figure 6:
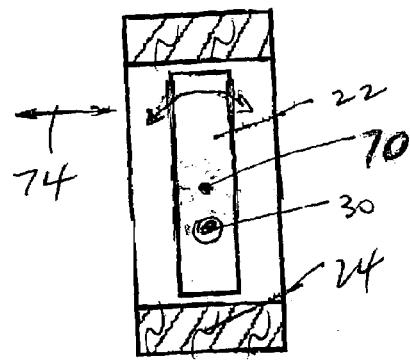
FIG. 6 is a schematic view of yet another embodiment of a light scanning arrangement in accordance with this invention.

As described so far, the hinge axis 30 is colinear with an axis of symmetry extending through a center of mass of the scan element, thereby resulting in a balanced scan element which oscillates when the frame is oscillated. This invention also contemplates, as shown in the schematic views of FIGS. 5 and 6, a weight imbalanced scan element 22 in which the hinge axis 30 is spaced a transverse distance away from an axis of symmetry 70 extending through the center of mass of the scan element. In FIG. 5, the hinge axis 30 is spaced horizontally away from the axis 70, whereas, in FIG. 6, the hinge axis 30 is spaced vertically away from the axis 70. If the frame 24 in FIG. 5 is moved vertically in the direction of double-headed arrows 72, then the scan element 22 will oscillate about the hinge axis 30. If the frame 24 in FIG. 6 is moved horizontally in the direction of double-headed arrow 74, then the scan element 22 will oscillate about the hinge axis 30. Thus, FIGS. 5 and 6 demonstrate that the scan element can be oscillated even by linear movement of the frame.

Figure 7:
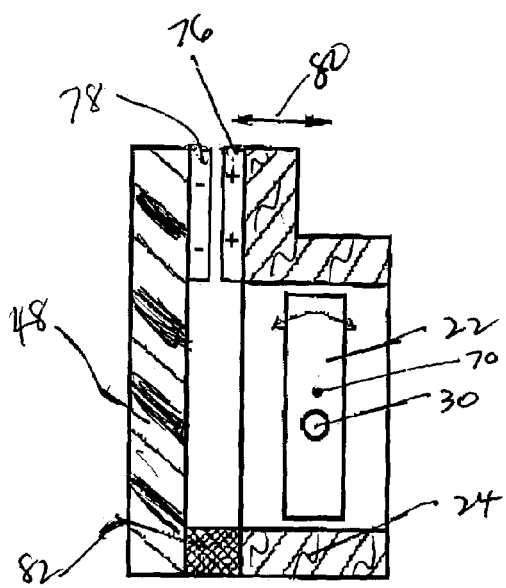
FIG. 7 is a schematic view of a further embodiment of a light scanning arrangement in accordance with this invention.

The movement of the frame need not be obtained from piezoelectric transducers, but instead, other drives may be employed. For example, FIG. 7 depicts an electrostatic drive in which an electrode 76 is mounted on the frame 24, and another electrode 67 is mounted on the board 48. A spacer 82 supports the frame 24 away from the board 48. By causing the electrodes to have opposite polarities, the frame 24 is moved horizontally in the direction of the double-headed arrow 80, and the scan element 22 oscillates in a manner analogous to that described above in connection with FIG. 6. Magnetic drives could also be used.

The light scanning component 20 described herein is not intended to be limited to applications involving reading coded indicia. Another important application resides in image projection in which a light beam is swept in a raster pattern of scan lines across a viewing surface, and in which the light beam is only rendered visible at selected positions along each scan line. Reference can be had to U.S. patent application Ser. No. 09/604,196 and U.S. patent application Ser. No. 09/604,197, both filed Jun. 27, 2000, and assigned to the assignee of the instant application, for details of such image projection displays.

It will be understood that each of the elements described above, or two or more together, also may find a useful application in other types of constructions differing from the types described above.

While the invention has been illustrated and described as embodied in an inertial drive scanning arrangement and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without from omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A light scanning arrangement, comprising:
   a) an oscillatable scan element for reflecting light incident thereon;
   b) a movable frame for supporting the scan element;
   c) a hinge extending along a hinge axis and connected between the frame and the scan element;
   d) a planar support structure; and
   e) an inertial drive for directly moving the frame and, by inertia, for indirectly oscillating the scan element about the hinge axis to scan the incident light, the inertial drive including a pair of elongated piezoelectric devices extending generally perpendicularly of the planar support structure and having first end regions connected to the planar support structure and opposite, second end regions connected to the frame at opposite sides of the hinge axis, the piezoelectric devices being operative for mechanically supporting the frame, and for pushing and pulling, respectively, on opposite sides of the frame to oscillate the scan element in opposite circumferential directions about the hinge axis when electrically energized by a periodic drive signal.

2. The arrangement of claim 1, wherein the scan element, the frame and the hinge are a one-piece, generally planar, silicon substrate.

3. The arrangement of claim 2, wherein the scan element has a specular coating.

4. The arrangement of claim 1, wherein the hinge includes two elongated hinge portions extending along the hinge axis, each hinge portion having one end region connected to the frame and an opposite end region connected to the scan element.

5. The arrangement of claim 1, wherein the frame surrounds the scan element and lies in a common plane therewith in a rest position of the arrangement.

6. The arrangement of claim 1, wherein the scan element has an axis of symmetry extending through a center of mass of the scan element, and wherein the hinge axis is collinear with the axis of symmetry, and wherein the drive is operative for directly oscillating the frame.

7. The arrangement of claim 1, wherein the scan element has an axis of symmetry extending through a center of mass of the scan element, and wherein the hinge axis is spaced along a transverse direction parallel to the axis of symmetry, and wherein the drive is operative for directly linearly moving the frame in a drive direction generally perpendicular to the transverse direction.

8. The arrangement of claim 1, wherein the drive is operative to oscillate the scan element at frequencies in excess of 1 kHz and over arcuate distances on the order of ±8° mechanical.

9. The arrangement of claim 1, and an additional pair of elongated piezoelectric devices extending generally perpendicularly of the planar support structure and having first end regions connected to the planar support structure and opposite, second end regions connected to the frame at the opposite sides of the hinge axis, the additional piezoelectric devices being operative, together with the first-mentioned pair, for mechanically supporting the frame, the additional pair being operative for monitoring the oscillating movement of the frame and to generate and conduct electrical feedback signals therefrom.

10. A light scanning arrangement, comprising:
a) an oscillatable scan element for reflecting light incident thereon;
b) a movable frame for supporting the scan element;
c) a hinge extending along a hinge axis and connected between the frame and the scan element; and
d) an inertial drive including a pair of elongated piezoelectric devices connected to opposite sides of the frame at opposite sides of the hinge axis, the piezoelectric devices expanding and contracting in length along opposite linear directions generally parallel to each other for directly pushing and pulling, respectively, on the opposite sides of the frame when electrically energized by a periodic drive signal and, by inertia, for indirectly oscillating the scan element about the hinge axis to scan the incident light.

11. The arrangement of claim 10, wherein the scan element, the frame and the hinge are a one-piece, generally planar, silicon substrate.

12. The arrangement of claim 11, wherein the scan element has a specular coating.

13. The arrangement of claim 10, wherein the hinge includes two elongated hinge portions extending along the hinge axis, each hinge portion having one end region connected to the frame and an opposite end region connected to the scan element.

14. The arrangement of claim 10, wherein the frame surrounds the scan element and lies in a common plane therewith in a rest position of the arrangement.

15. The arrangement of claim 10, wherein the scan element has an axis of symmetry extending through a center of mass of the scan element, and wherein the hinge axis is collinear with the axis of symmetry, and wherein the drive is operative for directly oscillating the frame.

16. The arrangement of claim 10, wherein the scan element has an axis of symmetry extending through a center of mass of the scan element, and wherein the hinge axis is spaced along a transverse direction parallel to the axis of symmetry, and wherein the drive is operative for directly linearly moving the frame in a drive direction generally perpendicular to the transverse direction.

17. The arrangement of claim 10, wherein the drive is operative to oscillate the scan element at frequencies in excess of 1 kHz and over arcuate distances on the order of ±8° mechanical.

18. A light scanning method, comprising the steps of:
a) reflecting light incident on an oscillatable scan element;
b) supporting the scan element on a movable frame:
c) connecting a hinge extending along a hinge axis and connected between the frame and the scan element; and
d) directly moving the frame and, by inertia, indirectly oscillating the scan element about the hinge axis to scan the incident light, the moving step being performed by connecting a pair of elongated piezoelectric devices to opposite sides of the frame at opposite sides of the hinge axis, and by electrically energizing the piezoelectric devices with a periodic drive signal to cause the piezoelectric devices to expand and contract in length along opposite linear directions generally parallel to each other for directly pushing and pulling, respectively, on the opposite sides of the frame to oscillate the scan element in opposite circumferential directions about the hinge axis.

19. The method of claim 18, and fabricating the scan element, the frame and the hinge of a one-piece, generally planar, silicon substrate.

20. The method of claim 19, and coating the scan element with a specular coating.

21. The method of claim 18, wherein the scan element has an axis of symmetry extending through a center of mass of the scan element, and wherein the hinge axis is collinear with the axis of symmetry, and wherein the drive step is performed by directly oscillating the frame.

22. The method of claim 18, wherein the scan element has an axis of symmetry extending through a center of mass of the scan element, and wherein the hinge axis is spaced along a transverse direction parallel to the axis of symmetry, and wherein the drive step is performed by directly linearly moving the frame in a drive direction generally perpendicular to the transverse direction.

23. The method of claim 18, wherein the drive step is performed by oscillating the scan element at frequencies in excess of 1 kHz and over arcuate distances on the order of ±8° mechanical.

24. An apparatus for providing a resonant beam sweep, the apparatus comprising:
a) a mirror device integrally formed from a single piece of material, the device including a reflective surface portion positioned to intercept a beam of light from a light source, and a pair of torsional hinges attached to the reflective surface portion and extending to a support portion for enabling the reflective surface portion to oscillate about an axis; and b) a driver circuit for generating vibrational energy in the reflective surface portion, the vibrational energy being inertially coupled from the support portion through the pair of torsional hinges to the reflective surface portion to oscillate the reflective surface portion about the axis between a selected lower limit below a resonant frequency and a selected upper limit above the resonant frequency, the driver circuit including a pair of elongated piezoelectric devices having lengths that expand and contract along opposite linear directions generally parallel to each other.

25. A method of providing an oscillating beam sweep across a target, the method comprising the steps of:
a) providing a reflective surface pivotally attached to, and integrally formed with, a support portion by a hinge arrangement, the reflective surface having a resonant frequency at which the reflective surface pivotally resonates about the hinge arrangement;
b) reflecting a light beam from the reflective surface;
c) locating the target to intercept the reflected light beam; and
d) inertially coupling vibrational energy to the reflective surface to cause the reflective surface to pivotally resonate about the hinge arrangement to continuously sweep the reflected light beam back and forth across the target by causing a pair of elongated piezoelectric devices to expand and contract in length along opposite linear directions generally parallel to each other.

26. A light scanning arrangement, comprising:
a) an oscillatable scan element for reflecting light incident thereon and having an axis of symmetry extending through a center of mass of the scan element;
b) a movable frame for supporting the scan element;
c) a hinge extending along a hinge axis spaced along a transverse direction generally parallel to the axis of symmetry and connected between the frame and the scan element; and
d) an inertial drive connected to opposite sides of the frame at opposite sides of the hinge axis for directly linearly pushing and pulling, respectively, on the opposite sides of the frame in a drive direction generally perpendicular to the transverse direction when electrically energized by a periodic drive signal and, by inertia, for indirectly oscillating the scan element about the hinge axis to scan the incident light.

27. A light scanning method, comprising the steps of:
a) reflecting light incident on an oscillatable scan element having a center of mass and an axis of symmetry;
b) supporting the scan element on a movable frame;
c) connecting a hinge extending along a hinge axis spaced along a transverse direction generally parallel to the axis of symmetry and connected between the frame and the scan element; and
d) directly moving the frame and, by inertia, indirectly oscillating the scan element about the hinge axis to scan the incident light, the moving step being performed by connecting an inertial drive to opposite sides of the frame at opposite sides of the hinge axis, and by electrically energizing the inertial drive with a periodic drive signal for directly linearly pushing and pulling, respectively, on the opposite sides of the frame in a drive direction generally perpendicular to the transverse direction.

* * * * *